United States Patent
Lee et al.

(10) Patent No.: US 10,878,557 B2
(45) Date of Patent: Dec. 29, 2020

(54) DEVICE FOR DETECTING DEFECT AND METHOD OF DRIVING THE SAME

(71) Applicant: Samsung Display Co., Ltd., Yongin-si (KR)

(72) Inventors: Hyung Jin Lee, Yongin-si (KR); Dae Hong Kim, Yongin-si (KR); Sung Hoon Yang, Yongin-si (KR); Se Yoon Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 162 days.

(21) Appl. No.: 16/136,094

(22) Filed: Sep. 19, 2018

(65) Prior Publication Data
US 2019/0147577 A1   May 16, 2019

(30) Foreign Application Priority Data

Nov. 15, 2017   (KR) .................. 10-2017-0152104

(51) Int. Cl.
*G06T 7/00* (2017.01)
*G01N 21/956* (2006.01)
*G01N 21/95* (2006.01)

(52) U.S. Cl.
CPC ......... *G06T 7/001* (2013.01); *G01N 21/9501* (2013.01); *G01N 21/95607* (2013.01); *G06T 7/0008* (2013.01); *G06T 2207/30148* (2013.01)

(58) Field of Classification Search
CPC ..... G06T 7/001; G06T 7/0002; G06T 7/0008; G06T 2207/30148; G01N 21/956; G01N 21/9501; G01N 21/95607
(Continued)

(56) References Cited

U.S. PATENT DOCUMENTS 7,539,583 B2 * 5/2009 Fu ................ G01N 21/9501
                                              382/144
2005/0035311 A1 * 2/2005 Asakawa ........... G02F 1/1309
                                              250/559.16
(Continued)

FOREIGN PATENT DOCUMENTS

KR    10-0537423    12/2005
KR    10-0558483    3/2006
KR    10-0694597    3/2007

OTHER PUBLICATIONS

Dongdong, Nie, et al., "Optimization based grayscale image colorization," Pattern Recognition Letters, vol. 28, 2007, pp. 1445-1451.
(Continued)

*Primary Examiner* — Daniel G Mariam
(74) *Attorney, Agent, or Firm* — Lewis Roca Rothgerber Christie LLP

(57) ABSTRACT

In a device for detecting a defect, the device includes: an image pickup unit including pixels, the image pickup unit generating a substrate image by picking up an image of a substrate having patterns formed on a top surface thereof; and a controller for detecting a defect located on the substrate, based on the substrate image, wherein the substrate image includes pattern images corresponding to the patterns, wherein each of the pattern images includes pixel values, wherein the controller detects the defect by comparing weights of pixel values for each of the pattern images.

13 Claims, 7 Drawing Sheets

(58) Field of Classification Search
USPC .................................................. 382/149, 218
See application file for complete search history.

(56) References Cited

U.S. PATENT DOCUMENTS

| | | |
|---|---|---|
| 2007/0025609 A1 | 2/2007 | Ryu et al. |
| 2010/0189339 A1* | 7/2010 | Amanullah ............. G06T 7/001 |
| | | 382/145 |
| 2013/0231769 A1* | 9/2013 | Tien ........................ G06T 7/001 |
| | | 700/121 |

OTHER PUBLICATIONS

Ojala, Timo, et al., "Multiresolution Gray-Scale and Rotation Invariant Texture Classification with Local Binary Patterns," IEEE Transactions on Pattern Analysis and Machine Intelligence, vol. 24, No. 7, Jul. 2002, pp. 971-987.

* cited by examiner

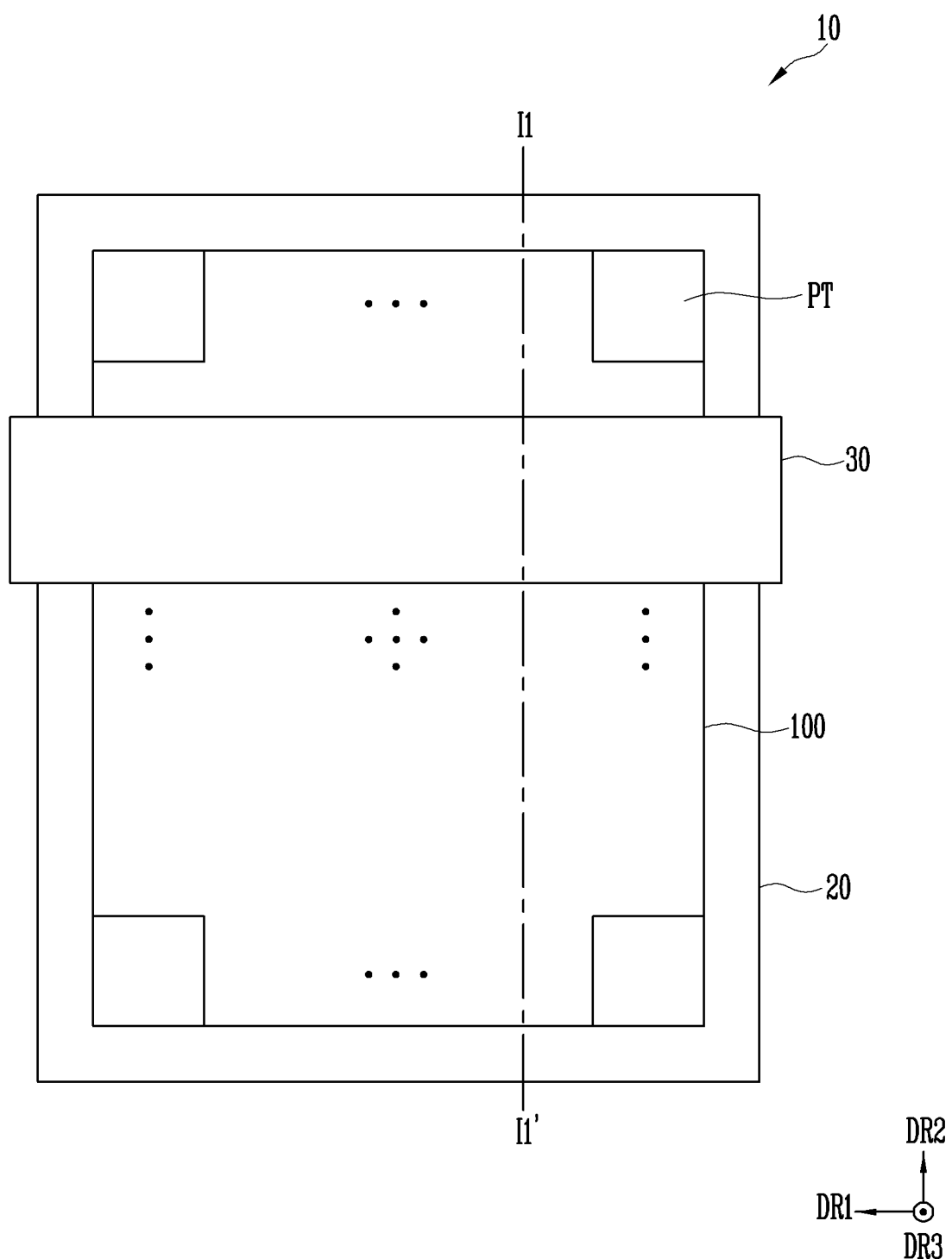

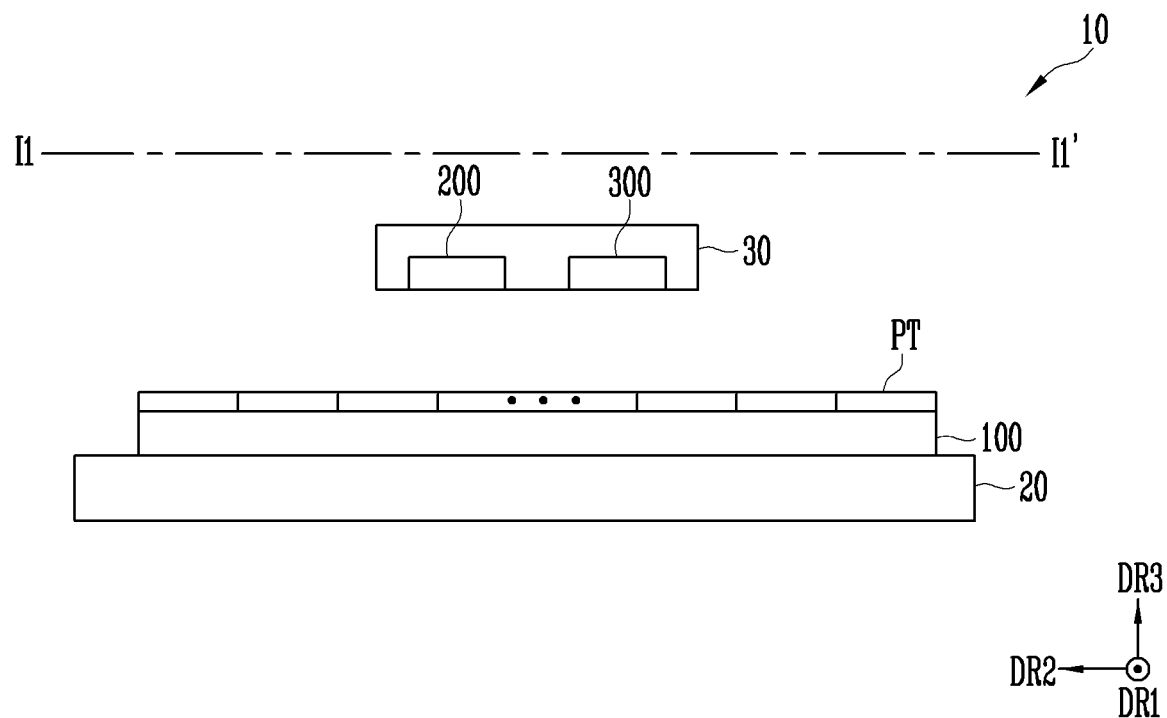

FIG. 7

TIPT :

TPV

| 100 | 100 | 100 |
|---|---|---|
| 100 | 50 | 100 |
| 100 | 100 | 100 |

TWV

| 11.76 | 11.76 | 11.76 |
|---|---|---|
| 11.76 | 5.88 | 11.76 |
| 11.76 | 11.76 | 11.76 |

RIPT :

RPV

| 50 | 50 | 50 |
|---|---|---|
| 50 | 50 | 50 |
| 50 | 50 | 50 |

RWV

| 11.11 | 11.11 | 11.11 |
|---|---|---|
| 11.11 | 11.11 | 11.11 |
| 11.11 | 11.11 | 11.11 |

DEVICE FOR DETECTING DEFECT AND METHOD OF DRIVING THE SAME

CROSS-REFERENCE TO RELATED APPLICATION

This application claims priority to and the benefit of Korean patent application 10-2017-0152104 filed on Nov. 15, 2017 in the Korean Intellectual Property Office, the entire disclosure of which is incorporated herein by reference.

BACKGROUND

1. Field

An aspect of the present disclosure relates to a device for detecting a defect and a method of driving the same.

2. Related Art

In general, a semiconductor device is fabricated through a fabrication (FAB) process of forming an electric circuit on a semiconductor substrate, an electrical die sorting (EDS) process of testing electrical characteristics of semiconductor devices formed in the FAB process, and a packaging process for encapsulating each of the semiconductor devices with epoxy resin and individualizing the semiconductor devices.

The FAB process includes a deposition process for forming a layer on a semiconductor substrate, a chemical mechanical polishing process for planarizing the layer, a photolithography process for forming a photoresist pattern on the layer, an etching process for forming the layer as a pattern having electrical characteristics using the photoresist pattern, an ion implantation process for implanting a specific ion in a set or predetermined region of the semiconductor substrate, a cleaning process for removing an impurity on the semiconductor substrate, a testing process for detecting a defect of the semiconductor substrate on which the layer and the pattern are formed, and the like.

In general, a test for detecting a defect of a semiconductor substrate is made by performing a semiconductor unit process, comparing patterns that are repeatedly formed in the substrate, and then checking a portion at which a defect exists among normal patterns.

In addition, the defect of the semiconductor substrate may be detected using light.

SUMMARY

Aspects of embodiments are directed toward a device for detecting a defect, which can more accurately detect a defect when comparing patterns having different distances from lighting, and a method of driving the device.

According, to an embodiment of the present disclosure, there is provided a device for detecting a defect, the device including: an image pickup unit including pixels, the image pickup unit being configured to generate a substrate image by picking up an image of a substrate having patterns formed on a top surface of the substrate; and a controller configured to detect a defect located on the substrate, based on the substrate image, wherein the substrate image includes pattern images corresponding to the patterns, wherein each of the pattern images includes pixel values, and wherein the controller is configured to detect the defect by comparing weights of pixel values for each of the pattern images.

The controller may include: a pattern image acquiring unit configured to acquire the pattern images, based on the substrate image; a target pattern setting unit configured to set a reference pattern image and a target pattern image based on the pattern images, and to generate pattern information based on the reference pattern image and the target pattern image; a comparator configured to compare the reference pattern image and the target pattern image based on the pattern information, and to generate a comparison result; and a defect detector configured to detect a defect based on the comparison result.

The target pattern setting unit may be configured to set a pattern image in which no defect is detected as the reference pattern image by performing comparison with at least two other pattern images, and set one of the pattern images, which is different from the reference pattern image, as the target pattern image.

The comparator may include: a pixel value extractor configured to extract reference pixel values from the reference pattern image based on the pattern information, and to extract target pixel values from the target pattern image; a weighted value calculator configured to calculate reference weighted values representing weights of the reference pixel values and target weighted values representing weights of the target pixel values; and a weight comparator configured to calculate difference values between the reference weighted values and the target weighted values, and to generate the comparison result by comparing the difference values with a threshold value.

The importance value calculator may be configured to calculate the reference weighted values and the target weighted values using the equation $$WVi = PVi/(PV1+PV2+\ldots+PVi+\ldots+PVn)*100.$$

Here, i is a natural number, n is a natural number equal to or greater than i, WVi is an ith weighted value, and PVi is an ith pixel value.

The device may further include a header located on the top of the substrate, the header having the image pickup unit mounted therein. The header may be moved such that the image pickup unit picks up an image of the substrate.

The device may further include a main body located on the bottom of the substrate. The main body may be moved such that the image pickup unit picks up an image of the substrate.

The device may further include a lighting unit including backlights, the lighting unit is configured to irradiate incident light onto the substrate.

The comparator may include: a pixel value extractor configured to extract reference pixel values from the reference pattern image, based on the pattern information, and extract target pixel values from the target pattern image; and a weight comparator configured to calculate normalized weighted values based on the reference pixel values and the target pixel values, and to generate the comparison result by comparing the normalized weighted values with a threshold value.

The weight comparator may be configured to calculate the normalized weighted values, using the equation $DV(x, y) = (RPV(x, y) - \text{average of RPVs}) * (TPV(x, y) - \text{average of TPVs})/(\Sigma(RPV(x, y) * TPV(x, y)))$.

Here, x and y are natural numbers, $DV(x, y)$ is a normalized weighted value having a coordinate (x, y), $RPV(x, y)$ is a reference value having the coordinate (x, y), average of RPVs is an average of the reference pixel values, $TPV(x, y)$ is a target pixel value having the coordinate (x, y), and average of TPVs is an average of the target pixel values.

According to an embodiment of the present disclosure, there is provided a method of driving a device for detecting a defect, the method including: generating a substrate image by picking up an image of a substrate having patterns formed on a top surface of the substrate using an image pickup unit including pixels; acquiring pattern images included in the substrate image based on the substrate image; setting a reference pattern image and a target pattern image based on the pattern images; comparing weights of pixel values of each of the reference pattern image and the target pattern image; and detecting a defect based on a comparison result.

The comparing of the weights of the pixel values of each of the reference pattern image and the target pattern image may include: extracting reference pixel values included in the reference pattern image and target pixel values included in the target pattern image; calculating reference weighted values based on the reference pixel values, and calculating target weighted values based on the target pixel values; and calculating difference values between the reference weighted values and the target weighted values, and generating a comparison result by comparing the difference values with a threshold value.

The comparing of the weights of the pixel values of each of the reference pattern image and the target pattern image may include: extracting reference pixel values included in the reference pattern image and target pixel values included in the target pattern image; and calculating normalized weighted values based on the reference pixel values and the target pixel values, and generating a comparison result by comparing the normalized weighted values with a threshold value.

The threshold value may be changed depending on the substrate image.

BRIEF DESCRIPTION OF THE DRAWINGS

Example embodiments will now be described more fully hereinafter with reference to the accompanying drawings; however, the inventive concept may be embodied in different forms and should not be construed as limited to the embodiments set forth herein. Rather, these embodiments are provided so that this disclosure will be thorough and complete, and will fully convey the scope of the inventive concept to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a diagram illustrating a front of the device according to an embodiment of the present disclosure.

FIG. 4 is a diagram illustrating a section of the device according to an embodiment of the present disclosure.

FIG. 7 is a diagram illustrating a method of calculating weighted values according to an embodiment of the present disclosure.

DETAILED DESCRIPTION

Figure 1:
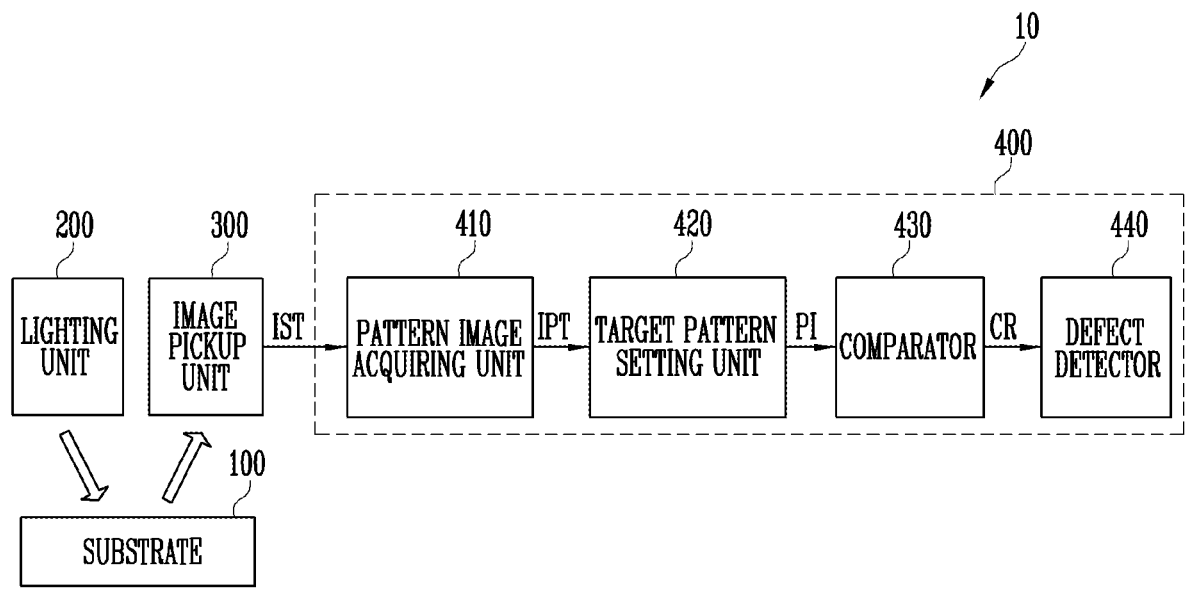
FIG. 1 is a block diagram illustrating a device for detecting a defect according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. Further, some of the elements that are not essential to the complete understanding of the disclosure are omitted for clarity. Also, like reference numerals refer to like elements throughout.

FIG. 1 is a block diagram illustrating a device for detecting a defect according to an embodiment of the present disclosure.

Referring to FIG. 1, the device 10 may include a lighting unit 200, an image pickup unit 300, and a controller 400.

The substrate 100 may be a semiconductor substrate. For example, the substrate 100 may be a wafer including a plurality of chips.

A plurality of elements or wires may be mounted on the substrate 100, and various semiconductor processes may be performed on the substrate 100. Therefore, patterns may be formed on the substrate 100. At the same time, defects may occur on the substrate 100.

The defect may include dust or a stain formed on the substrate, in addition to a process defect or an element defect. However, the present disclosure is not limited thereto.

The lighting unit 200 may include a plurality of backlights. The plurality of backlights may irradiate incident light toward the substrate 100.

The incident light may be broadband light. For example, the incident light may include rays from ultraviolet rays to near infrared rays.

The image pickup unit 300 may pick up an image of the substrate 100. That is, the image pickup unit 300 may generate a substrate image IST, using incident light reflected from the substrate 100. For example, the image pickup unit 300 may be implemented with a camera.

Also, the image pickup unit 300 may include a plurality of pixels. Therefore, the substrate image IST may include pixel values corresponding to the plurality of pixels.

The image pickup unit 300 may output the substrate image IST to the controller 400.

The controller 400 may detect a defect located on the substrate 100 using the substrate image IST.

For example, the substrate image IST may include pattern images IPT. The pattern images IPT may correspond to the patterns formed on the substrate 100. In addition, each of the pattern images IPT may include corresponding pixel values. The controller 400 may detect a defect on the substrate 100 by comparing weights of the pixel values of the pattern images IPT.

The controller 400 may include a pattern image acquiring unit 410, a target pattern setting unit 420, a comparator 430, and a defect detector 440.

The pattern image acquiring unit 410 may receive a substrate image IST.

The pattern image acquiring unit 410 may acquire pattern images IPT, based on the substrate image IST.

For example, the pattern image acquiring unit 410 may acquire the pattern images IPT by dividing the substrate image IST into a plurality of areas.

In some embodiments, the pattern image acquiring unit 410 may acquire the pattern images IPT by setting an area repeated in the substrate image IST as a pattern image IPT.

In another embodiment, the pattern image acquiring unit 410 may acquire the pattern images IPT, based on information stored in a memory or information input from the outside (e.g., from an external system).

The pattern image acquiring unit 410 may transmit the pattern images IPT to the target pattern setting unit 420.

The target pattern setting unit 420 may receive the pattern images IPT.

The target pattern setting unit 420 may set a reference pattern image and a target pattern image based on the pattern images IPT.

For example, the target pattern setting unit 420 may set any one of the pattern images IPT as the reference pattern image.

Here, the reference pattern image refers to a pattern image IPT in which no defect is detected (e.g., no defect of any kind is detected, or no defect of a particular kind is detected). In some embodiments, the reference pattern image may be previously set or be set by the controller 400.

In some embodiments, the target pattern setting unit 420 may set a pattern image in which no defect is detected as the reference pattern image by performing comparison with at least two other pattern images.

For example, first, the target pattern setting unit 420 may set a first sub-pattern image and a second sub-pattern image so as to set the reference pattern image. When no defect is, detected by performing, comparison on the first, sub-pattern image and the second sub-pattern image, the target pattern setting unit 420 may set a third sub-pattern image different from the first sub-pattern image and the second sub-pattern image. When no defect is detected by performing comparison on the first sub-pattern image and the third sub-pattern image, the target pattern setting unit 420 may set the first sub-pattern image as the reference pattern image.

Also, the target pattern setting unit 420 may set any one of the pattern images IPT, which is different from the reference pattern image, as a target pattern image. Here, the target pattern image refers to a pattern image IPT on which defect detection has not been performed yet.

The target pattern setting unit 420 may generate pattern information PI representing the reference pattern image and the target pattern image.

For example, the pattern information PI may refer to information on the reference pattern image and the target pattern image among the pattern images IPT.

The target pattern setting unit 420 may transmit the pattern information PI to the comparator 430.

The comparator 430 may receive the pattern information PI.

The comparator 430 may compare the reference pattern image and the target pattern image, based on the pattern information PI.

For example, the comparator 430 may compare weights of pixel values of each of the reference pattern image and the target pattern image.

The comparator 430 may generate a comparison result CR.

For example, when the difference between weights for each pixel value is larger than a preset threshold value, the comparison result CR may be generated to represent 1. When the difference between weights for each pixel value is smaller than or equal to the preset threshold value, the comparison result CR may be generated to represent 0.

This will be described in detail with reference to FIG. 7.

The defect detector 440 may receive the comparison result CR.

The defect detector 440 may detect a defect, based on the comparison result CR.

For example, when the comparison result CR represents {0, 0, 0, 0, 1, 0, 0, 0, 0}, the defect detector 440 may determine that a defect has occurred in a pattern corresponding to the target pattern image. Also, the defect detector 440 may determine that a defect has occurred in an area corresponding to a fifth pixel value PV5 (see FIG. 6), based on the comparison result CR.

In FIG. 1, it is illustrated that the pattern image acquiring unit 410, the target pattern setting unit 420, the comparator 430, and the defect detector 440 are components separate from one another, but the present disclosure is not limited thereto. In some embodiments, at least two of the target pattern setting unit 420, the comparator 430, and the defect detector 440 may be combined.

Figure 2A:
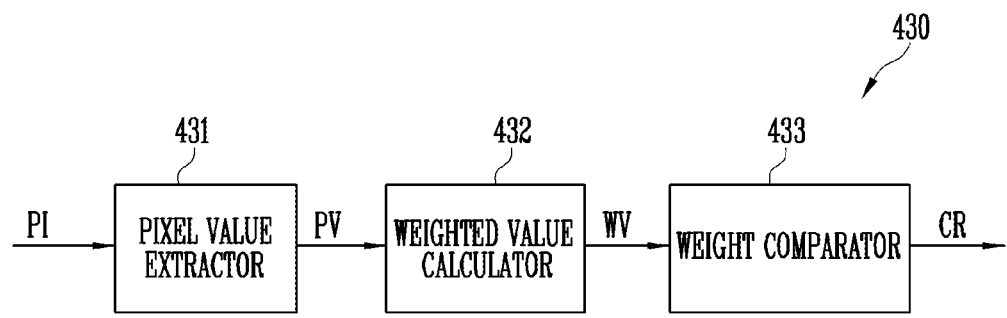
FIG. 2A is a block diagram illustrating a comparator according to an embodiment of the present disclosure.

FIG. 2A is a block diagram illustrating a comparator according to an embodiment of the present disclosure.

Referring to FIG. 2A, the comparator 430 may include a pixel value extractor 431, a weighted value calculator 432, and a weight comparator 433.

The pixel value extractor 431 may receive pattern information PI.

The pixel value extractor 431 may extract pixel values PV included in the reference pattern image and the target pattern image, based on the pattern information PI.

For example, the pixel value extractor 431 may extract reference pixel values from the reference pattern image, and extract target pixel values from the target pattern image.

The pixel value extractor 431 may transmit the pixel values PV including the reference pixel values and the target pixel values to the weighted value calculator 432.

The weighted value calculator 432 may receive the pixel values PV.

The weighted value calculator 432 may calculate weighted values WV based on the pixel values PV.

For example, the weighted value calculator 432 may calculate reference weighted values and target weighted values.

Here, the reference weighted value may represent a weight of each of the reference pixel values. Similarly, the target weighted value may represent a weight of each of the target pixel values.

In some embodiments, the weighted value calculator 432 may calculate the reference weighted values and the target weighted values, using Equation 1.

$$WVi=PVi/(PV1+PV2+ \ldots +PVi+ \ldots +PVn)*100$$ ($i$ is a natural number, and $n$ is a natural number equal to or greater than $i$)   Equation 1

Here, WVi is an ith weighted value, and PVi is an ith pixel value.

For example, if four pixel values are included in the reference pattern image, and the reference pixel values are {100, 100, 100, 100}, respectively, the reference weighted values may be calculated as {25, 25, 25, 25}, respectively.

In addition, if four pixel values are included in the target pattern image, and the target pixel values are {50, 50, 100, 50}, respectively, the target weighted values may be calculated as {20, 20, 40, 20}, respectively.

The weighted value calculator 432 may transmit the weighted values WV to the weight comparator 433.

The weight comparator 433 may receive the weighted values WV.

The weight comparator 433 may calculate difference values between the reference weighted values and the target weighted values. For example, if the reference weighted values are {25, 25, 25, 25} and the target weighted values are {20, 20, 40, 20}, the difference values may be calculated as {5, 5, 15, 5} (signs are omitted).

The weight comparator 433 may compare the difference values with a threshold value. Here, the threshold value may be a value that is set (e.g., preset) to be stored in a memory or a value that is separately input.

For example, if the difference values are {5, 5, 15, 5}, and the threshold value is preset as 10, the weight comparator 433 may compare each of the difference value with the threshold value.

At this time, the threshold value may be changed depending on the substrate image IST.

The weight comparator 433 may generate a comparison result CR by comparing the difference values with the threshold value.

The weight comparator 433 may generate the comparison result CR and transmit the comparison result CR to the defect detector 440.

Referring to FIG. 1, the defect detector 440 may detect a defect based on the comparison result CR.

For example, when the comparison result CR represents {0, 0, 0, 0, 1, 0, 0, 0, 0}, the defect detector 440 may determine that a defect has occurred in a pattern corresponding to the target pattern image. Also, the defect detector 440 may determine that a defect has occurred in an area corresponding to a fifth pixel value PV5 (see FIG. 6), based on the comparison result CR.

In FIG. 2A, it is illustrated that the pixel value extractor 431, the weighted value calculator 432, and the weight comparator 433 are components separate from one another, but the present disclosure is not limited thereto. In some embodiments, at least two of the pixel value extractor 431, the weighted value calculator 432, and the weight comparator 433 may be combined.

Figure 2B:
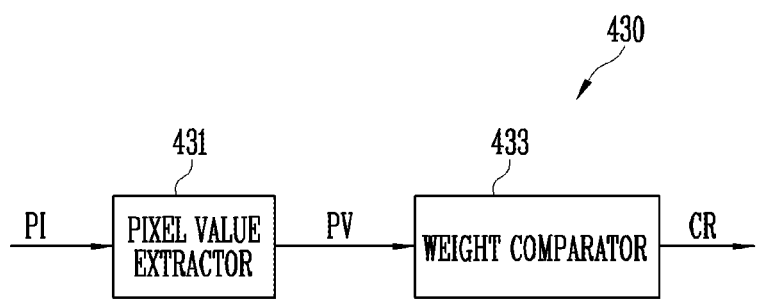
FIG. 2B is a block diagram illustrating a comparator according to another embodiment of the present disclosure.

FIG. 2B is a block diagram illustrating a comparator according to another embodiment of the present disclosure.

Referring to FIG. 2B, the weight comparator 433 may be combined with the weighted value calculator 432 (e.g., the weight comparator 433 of FIG. 2B may incorporate the functions of the weight comparator 433 and the weighted value calculator 432 described above with reference to FIG. 2A).

The weight comparator 433 may calculate normalized weighted values using Equation 2. That is, the weight comparator 433 may calculate the normalized weighted values, using Equation 2, based on the reference pixel values and the target pixel values.

$$DV(x,y)=(RPV(x,y)-\text{average of RPVs})*(TPV(x,y)-\text{average of TPVs})/(\Sigma(RPV(x,y)*TPV(x,y)))$$ ($x$ and $y$ are natural numbers)   Equation 2

Here, DV(x, y) is a normalized weighted value having a coordinate (x, y), RPV(x, y) is a reference value having the coordinate (x, y), average of RPVs is an average of the reference pixel values, TPV(x, y) is a target pixel value having the coordinate (x, y), and average of TPVs is an average of the target pixel values.

That is, if Equation 2 is used, the weight comparator 433 may normalize the reference pixel values and the target pixel values. Therefore, the threshold value may be maintained as a fixed value that is not changed depending on the substrate image.

The weight comparator 433 may generate a comparison result CR by comparing the normalized weighted values with the threshold value.

The weight comparator 433 may generate the comparison result CR and transmit the comparison result CR to the defect detector 440.

FIG. 3 is a diagram illustrating a front of the device according to an embodiment of the present disclosure. FIG. 4 is a diagram illustrating a section of the device according to an embodiment of the present disclosure.

Hereinafter, the device 10 is described along a first direction DR1, a second direction DR2, and a third direction DR3.

FIG. 4 illustrates a section of the device 10, which passes through line I1-I1' and is taken along a plane defined by the second direction DR2 and the third direction DR3.

Referring to FIGS. 3 and 4, the device 10 may include a main body 20 and a header 30.

The main body 20 or the header 30 may, include the controller 400 shown in FIG. 1.

The main body 20 may support the substrate 100. That is, the substrate 100 may be placed on the top of the main body 20. The substrate 100 may be fixed to the top of the main body 20. However, the present disclosure is not limited thereto, and the substrate 100 may be supported by a separate component.

In some embodiments, the main body 20 may be moved together with the substrate 100 (e.g., moved with respect to the header 30). For example, the main body 20 may be moved along the second direction DR2.

As the substrate 100 is moved (e.g., as the main body 20 is moved), the image pickup unit 300 may pick up an image of the substrate 100, using light from the lighting unit 200, and generate a substrate image IST.

The header 30 may include the lighting unit 200 and the image pickup unit 300, which are shown in FIG. 1. That is, the lighting unit 200 and the image pickup unit 300 may be mounted on the bottom of the header 30.

The header 30, as shown in the drawings, may be located on the top of the substrate 100.

In some embodiments, the header 30 may be moved along the second direction DR2. As the header 30 is moved, the image pickup unit 300 may pick up an image of the substrate, using light from the lighting unit 200, and generate a substrate image IST.

A plurality of elements or wires may be mounted on the substrate 100, and various semiconductor processes may be performed on the substrate 100. Therefore, patterns PT may be formed on the substrate 100.

The patterns PT may be formed in a matrix structure and/or repeatedly (e.g., in a repeating pattern) on a top surface of the substrate 100.

Figure 5:
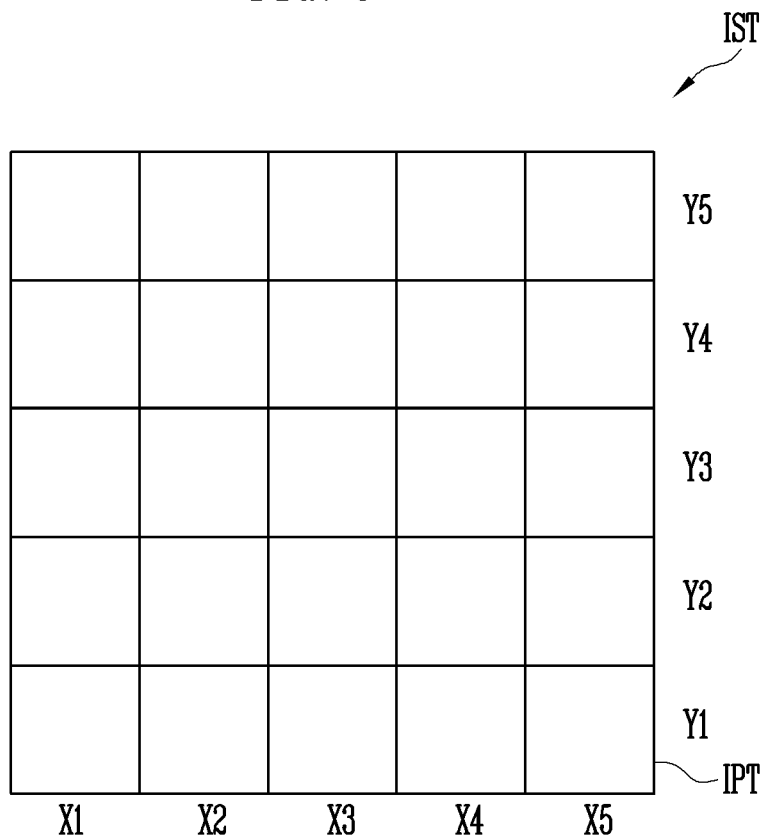
FIG. 5 is a diagram illustrating a substrate image according to an embodiment of the present disclosure.

FIG. 5 is a diagram illustrating a substrate image according to an embodiment of the present disclosure. Referring to FIG. 5, the substrate image IST may include pattern images IPT.

In FIG. 5, it is illustrated that the substrate image IST includes 25 pattern images IPT, but the present disclosure is not limited thereto. In some embodiments, the substrate image IST may include various numbers of pattern images IPT.

Also, in FIG. 5, it is illustrated that each of the substrate image IST and the pattern image IPT has a square shape, but the present disclosure is not limited thereto. In some embodiments, each of the substrate image IST and the pattern image IPT may have various suitable shapes.

Referring to FIGS. 1 and 5, the pattern image acquiring unit 410 may acquire pattern images IPT corresponding to a plurality of patterns in the substrate image IST.

The target pattern setting unit 420 may set a reference pattern image and a target pattern image, based on the pattern images IPT.

For example, the target pattern setting unit 420 may set any one of the pattern images IPT as the reference pattern image.

In some embodiments, the target pattern setting unit 420 may set a pattern image in which no defect is detected as the reference pattern image by performing comparison with at least two other pattern images.

For example, the target pattern setting unit 420 may set a first sub-pattern image having a coordinate (X1, Y1) and a second sub-pattern image having a coordinate (X1, Y2) so as to set the reference pattern image.

When no defect is detected by performing comparison on the first sub-pattern image and the second sub-pattern image, the target pattern setting unit 420 may set a third sub-pattern image having a coordinate (X1, Y3) different from the coordinate (X1, Y1) of the first sub-pattern image and the coordinate (X1, Y2) of the second sub-pattern image.

When no defect is detected by performing comparison on the first sub-pattern image and the third, sub-pattern image, the target pattern setting unit 420 may set the first sub-pattern image having the coordinate (X1, Y1) as the reference pattern image.

Also, the target pattern setting unit 420 may set another one of the pattern images IPT as the target pattern image.

That is, when the pattern image IPT having the coordinate (X1, Y1) is set as the reference pattern image, the target pattern setting unit 420 may set, as the target pattern image, a pattern image IPT having a coordinate different from the coordinate (X1, Y1) (e.g., (X2, Y2)).

Figure 6:
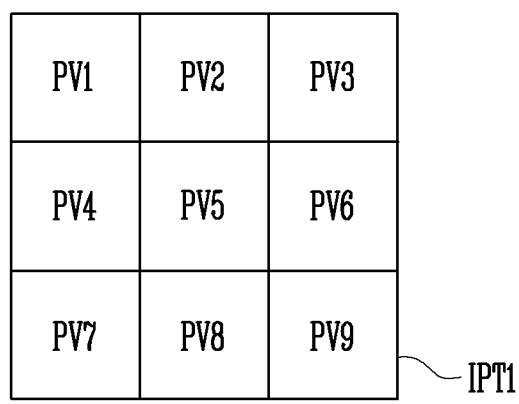
FIG. 6 is a diagram illustrating a pattern image according to an embodiment of the present disclosure.

FIG. 6 is a diagram illustrating a pattern image according to an embodiment of the present disclosure.

Referring to FIG. 6, the pattern image IPT1 may include a plurality of pixels PV1 to PV9.

In FIG. 6, it is illustrated that the pattern image IPT1 includes 9 pixel values PV1 to PV9, but the present disclosure is not limited thereto. In some embodiments, the pattern image IPT1 may include various numbers of pixel values.

Referring to FIGS. 2A, 2B, and 6, the pixel value extractor 431 may extract pixel values PV1 to PV9 included in the reference pattern image and the target pattern image.

For example, the pixel value extractor 431 may extract pixel values PV1 to PV9 included in the pattern image IPT1.

FIG. 7 is a diagram illustrating a method of calculating weighted values according to an embodiment of the present disclosure.

Referring to FIGS. 2A and 7, a target pattern image TIPT may include target pixel values TPV, and a reference pattern image RIPT may include reference pixel values RPV.

For convenience of description, it may be assumed that the target pixel values TPV are {100, 100, 100, 100, 50, 100, 100, 100, 100} and the reference pixel values RPV are {50, 50, 50, 50, 50, 50, 50, 50, 50}.

The weighted value calculator 432 may calculate target weighted values TWV, based on the target pixel values TPV, and calculate reference weighted values RWV, based on the reference pixel values RPV.

For example, as shown in FIG. 7, the target weighted values TWV may be calculated as {11.76, 11.76, 11.76, 11.76, 5.88, 11.76, 11.76, 11.76, 11.76}, using Equation 1, and the reference weighted values RWV may be calculated as {11.11, 11.11, 11.11, 11.11, 11.11, 11.11, 11.11, 11.11, 11.11}, using Equation 1.

The weight comparator 433 may calculate difference values of each of the reference weighted values RWV and the target weighted values TWV.

For example, the difference values may be calculated as {0.65, 0.65, 0.65, 0.65, 5.23, 0.65, 0.65, 0.65, 0.65} (signs are omitted).

The weight comparator 433 may generate a comparison result CR by comparing the difference values with the threshold value.

For example, when the difference values are set (e.g., calculated) as {0.65, 0.65, 0.65, 0.65, 5.23, 0.65, 0.65, 0.65, 0.65} and the threshold value is preset as 5, the weight comparator 433 may generate the comparison result CR as {0, 0, 0, 0, 1, 0, 0, 0, 0} by comparing each of the difference values with the threshold value.

Referring to FIGS. 1, 2A, and 7, the defect detector may detect a defect, based on the comparison result CR.

For example, when the comparison result CR represents {0, 0, 0, 0, 1, 0, 0, 0, 0}, the defect detector 440 may determine that a defect has occurred in a pattern corresponding to the target pattern image. Also, the defect detector 440 may determine that a defect has occurred in an area corresponding to the fifth pixel value PV5 (see FIG. 6), based on the comparison result CR.

Figure 8:
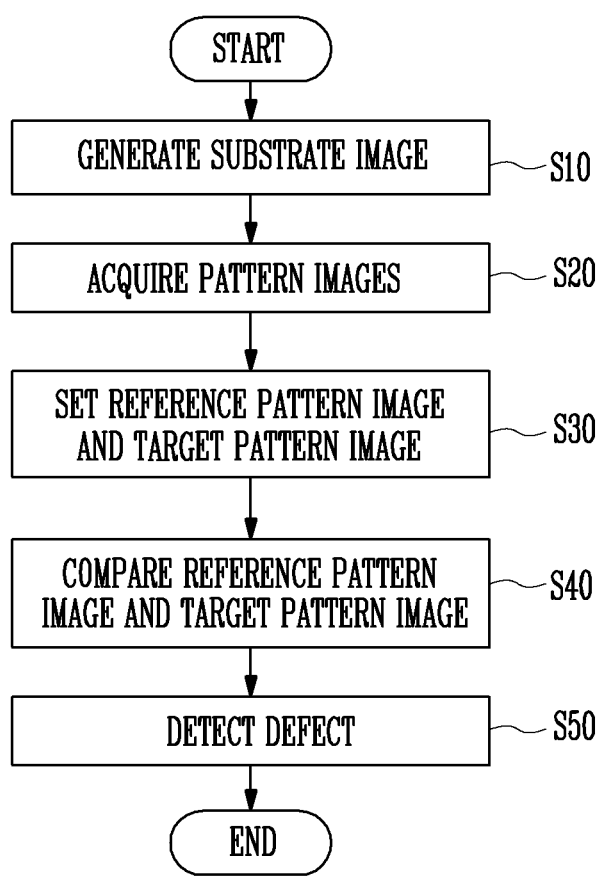
FIG. 8 is a flowchart illustrating a method of driving the device according to an embodiment of the present disclosure.

FIG. 8 is a flowchart illustrating a method of driving the device according to an embodiment of the present disclosure.

Hereinafter, the method of driving the device will be described with reference to FIGS. 1 to 8.

In step S10, the device 10 may generate a substrate image IST.

For example, the device 10 may include the lighting unit 200 and the image pickup unit 300, and the image pickup unit 300 may generate the substrate image IST, using incident light reflected from the substrate 100.

In step S20, the device 10 may acquire pattern images IPT.

For example, the pattern image acquiring unit 410 of the device 10 may acquire the pattern images IPT, based on the substrate image IST.

In step S30, the device 10 may set a reference pattern image RIPT and a target pattern image TIPT.

For example, the target pattern setting unit 420 of the device 10 may set a reference pattern image and a target pattern image, based on the pattern images IPT. The target pattern setting unit 420 may generate pattern information PI representing the reference pattern image and the target pattern image.

In step S40, the device 10 may compare the reference pattern image RIPT and the target pattern image TIPT.

For example, the comparator 430 of the device 10 may compare the reference pattern image and the target pattern image, based on the pattern information PI.

In some embodiments, the comparator 430 may compare weights of pixel values of each of the reference pattern image and the target pattern image.

In step S50, the device 10 may detect a defect.

For example, the defect detector 440 of the device 10 may detect a defect, based on a comparison result CR.

Figure 9A:
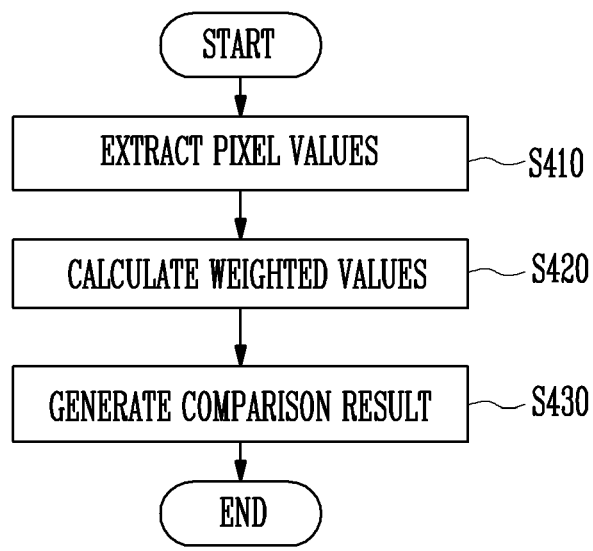
FIG. 9A is a flowchart illustrating in detail a step of comparing a reference pattern image and a target pattern image, which is shown in FIG. 8, according to an embodiment of the present disclosure.

FIG. 9A is a flowchart illustrating in more detail the step of comparing the reference pattern image and the target pattern image, which is shown in FIG. 8, according to an embodiment of the present disclosure.

Hereinafter, the step of comparing the reference pattern image RIPT and the target pattern image TIPT will be described in more detail with reference to FIGS. 1 to 9.

In step S410, the device 10 may extract pixel values PV. For example, the pixel value extractor 431 of the device may extract reference pixel values included in the reference pattern image and target pixel values included in the target pattern image.

In step S420, the device 10 may calculate weighted values WV. For example, the weighted value calculator 432 of the device 10 may calculate weighted values WV based on the pixel values PV. Specifically, the weighted value calculator 432 may calculate reference weighted values based on the reference pixel values, and calculate target weighted values based on the target pixel values.

In step S430, the device 10 may generate a comparison result CR. For example, the weight comparator 433 of the device 10 may calculate difference values between the reference weighted values and the target weighted values. The weight comparator 433 may generate a comparison result CR by comparing the difference values with a threshold value.

Figure 9B:
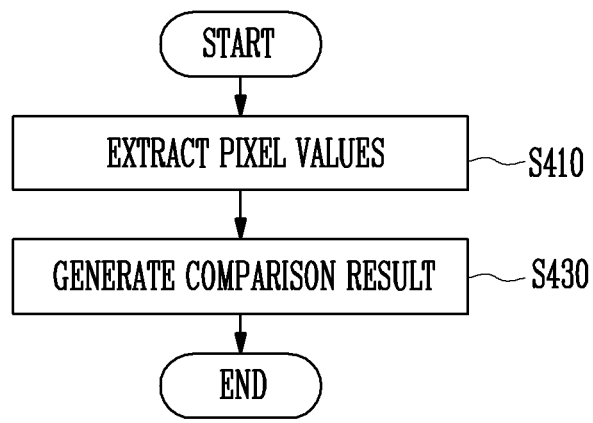
FIG. 9B is a flowchart illustrating in detail the step of comparing the reference pattern image and the target pattern image, which are shown in FIG. 8, according to another embodiment of the present disclosure.

FIG. 9B is a flowchart illustrating in more detail the step of comparing the reference pattern image and the target pattern image, which are shown in FIG. 8, according to another embodiment of the present disclosure.

In FIG. 9B, differences from FIG. 9A will be mainly described for convenience of description.

In step S410, the device 10 may extract pixel values PV. For example, the pixel value extractor 431 of the device may extract reference pixel values included in the reference pattern image and target pixel values included in the target pattern image.

In step S430, the device 10 may generate a comparison result CR. For example, the weight comparator 433 of the device 10 may calculate normalized weighted values based on the reference pixel values and the target pixel values. The weight comparator 433 may generate a comparison result CR by comparing the normalized weighted values with a threshold value.

In the device and the method of driving the same, a defect may be more accurately detected when comparing patterns having different distances from lighting.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an, example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the effective filing date of the present application, features, characteristics, and/or elements described in connection with a particular embodiment may be used singly or in combination with features, characteristics, and/or elements described in connection with other embodiments unless otherwise specifically, indicated. Accordingly, it will be understood by those of skill in the art that various changes in form and details may be made without departing from the spirit and scope of the present disclosure as set forth in the following claims, and equivalents thereof.

What is claimed is:

1. A device for detecting a defect, the device comprising:
an image pickup unit including pixels, the image pickup unit being configured to generate a substrate image by picking up an image of a substrate having patterns formed on a top surface of the substrate; and
a controller configured to detect a defect located on the substrate based on the substrate image,
wherein the substrate image includes pattern images corresponding to the patterns,
wherein each of the pattern images includes pixel values, and
wherein the controller is configured to set a reference pattern image and a target pattern image based on the pattern images, to extract reference pixel values from the reference pattern image, to extract target pixel values from the target pattern image, to calculate normalized weighted values based on the reference pixel values and the target pixel values, and to detect the defect by comparing the normalized weighted values with a threshold value.

2. The device of claim 1, wherein the controller includes:
a pattern image acquiring unit configured to acquire the pattern images based on the substrate image;
a target pattern setting unit configured to set the reference pattern image and the target pattern image based on the pattern images, and to generate pattern information based on the reference pattern image and the target pattern image;
a comparator configured to compare the reference pattern image and the target pattern image based on the pattern information, and to generate a comparison result; and
a defect detector configured to detect the defect based on the comparison result.

3. The device of claim 2, wherein the target pattern setting unit is configured to:
set a pattern image in which no defect is detected as the reference pattern image by performing comparison with at least two other pattern images; and
set one of the pattern images which is different from the reference pattern image as the target pattern image.

4. The device of claim 2, wherein the comparator includes:
a pixel value extractor configured to extract the reference pixel values and the target pixel values based on the pattern information; and
a weight comparator configured to calculate the normalized weighted values, and to generate the comparison result by comparing the normalized weighted values with the threshold value.

5. The device of claim 4, wherein the weight comparator is configured to calculate the normalized weighted values, using the equation $DV(x, y)=(RPV(x, y)-\text{average of RPVs})*(TPV(x, y)-\text{average of TPVs})/(\Sigma(RPV(x, y)*TPV(x, y)))$,
wherein x and y are natural numbers, $DV(x, y)$ is a normalized weighted value having a coordinate $(x, y)$, $RPV(x, y)$ is a reference value having the coordinate $(x, y)$, average of RPVs is an average of the reference pixel values, $TPV(x, y)$ is a target pixel value having the coordinate $(x, y)$, and average of TPVs is an average of the target pixel values.

6. The device of claim 1, further comprising a header located on a top of the substrate, the header having the image pickup unit mounted therein, wherein the header is configured to be moved such that the image pickup unit picks up the image of the substrate.

7. The device of claim 1, further comprising a main body located on a bottom of the substrate, wherein the main body is configured to be moved such that the image pickup unit picks up the image of the substrate.

8. The device of claim 1, further comprising a lighting unit including backlights, the lighting unit being configured to irradiate incident light onto the substrate.

9. A device for detecting a defect, the device comprising:
an image pickup unit including pixels, the image pickup unit configured to generate a substrate image by picking up an image of a substrate having patterns formed on a top surface of the substrate; and
a controller configured to detect a defect located on the substrate based on the substrate image,
wherein the substrate image includes pattern images corresponding to the patterns,
wherein each of the pattern images includes pixel values,
wherein the controller is configured to set a reference pattern image and a target pattern image based on the pattern images, to extract reference pixel values from the reference pattern image, to extract target pixel values from the target pattern image, to calculate reference weighted values representing weights of the reference pixel values and target weighted values representing weights of the target pixel values, and to detect the defect based on difference values between the reference weighted values and the target weighted values,
wherein the controller is configured to calculate the reference weighted values and the target weighted values using the equation $$WV_i = PV_i/(PV1+PV2+\ldots+PV_i+\ldots+PV_n)*100,$$
and wherein i is a natural number, n is a natural number equal to or greater than i, $WV_i$ is an ith weighted value, and $PV_i$ is an ith pixel value.

10. The device of claim 9, wherein the controller includes:
a pattern image acquiring unit configured to acquire the pattern images based on the substrate image;
a target pattern setting unit configured to set the reference pattern image and the target pattern image based on the pattern images, and to generate pattern information based on the reference pattern image and the target pattern image;
a comparator configured to compare the reference pattern image and the target pattern image based on the pattern information, and to generate a comparison result; and
a defect detector configured to detect the defect based on the comparison result, and
wherein the comparator includes:
a pixel value extractor configured to extract the reference pixel values and the target pixel values based on the pattern information;
a weighted value calculator configured to calculate the reference weighted values and the target weighted values; and
a weight comparator configured to calculate the difference values, and to generate the comparison result by comparing the difference values with a threshold value.

11. A method of driving a device for detecting a defect, the method comprising:

generating a substrate image by picking up an image of a substrate having patterns formed on a top surface of the substrate using an image pickup unit including pixels;

acquiring pattern images included in the substrate image based on the substrate image;

setting a reference pattern image and a target pattern image based on the pattern images;

comparing weights of pixel values of each of the reference pattern image and the target pattern image; and detecting a defect based on a comparison result, wherein the comparing of the weights of the pixel values of each of the reference pattern image and the target pattern image includes:

extracting reference pixel values included in the reference pattern image and target pixel values included in the target pattern image; and calculating normalized weighted values based on the reference pixel values and the target pixel values, and generating a first comparison result by comparing the normalized weighted values with a first threshold value.

12. The method of claim 11, wherein the comparing of the weights of the pixel values of each of the reference pattern image and the target pattern image further includes:

calculating reference weighted values based on the reference pixel values, and calculating target weighted values based on the target pixel values; and calculating difference values between the reference weighted values and the target weighted values, and generating a second comparison result by comparing the difference values with a second threshold value.

13. The method of claim 12, wherein the second threshold value is changed depending on the substrate image.

* * * * *